United States Patent
Otwell

(10) Patent No.: US 10,810,895 B2
(45) Date of Patent: *Oct. 20, 2020

(54) FACIAL EXPRESSION RECOGNITION IN EDUCATIONAL LEARNING SYSTEMS

(71) Applicant: Laureate Education, Inc., Baltimore, MD (US)

(72) Inventor: Ken Otwell, Columbia, MD (US)

(73) Assignee: Laureate Education, Inc., Baltimore, MD (US)

(*) Notice: Subject to any disclaimer, the term of this patent is extended or adjusted under 35 U.S.C. 154(b) by 29 days.

This patent is subject to a terminal disclaimer.

(21) Appl. No.: 16/374,940

(22) Filed: Apr. 4, 2019

(65) Prior Publication Data

US 2019/0236968 A1    Aug. 1, 2019

Related U.S. Application Data

(63) Continuation of application No. 14/086,695, filed on Nov. 21, 2013, now Pat. No. 10,319,249.

(60) Provisional application No. 61/728,989, filed on Nov. 21, 2012.

(51) Int. Cl.
    *G09B 5/02*    (2006.01)
(52) U.S. Cl.
    CPC ..................... *G09B 5/02* (2013.01)
(58) Field of Classification Search
    CPC ............... G09B 5/06; G09B 9/00; G09B 5/02
    USPC ....................................................... 434/365
    See application file for complete search history.

(56) References Cited

U.S. PATENT DOCUMENTS

| | | | | |
|---|---|---|---|---|
| 2003/0175676 A1* | 9/2003 | Theilmann | ............... | G09B 7/00 434/350 |
| 2005/0095569 A1* | 5/2005 | Franklin | .................. | G09B 7/00 434/350 |
| 2007/0117073 A1* | 5/2007 | Walker | ..................... | G09B 1/36 434/236 |
| 2008/0270240 A1* | 10/2008 | Chu | ................. | G06Q 10/06375 705/14.11 |
| 2009/0291426 A1* | 11/2009 | Polivka | .................... | G09B 7/00 434/350 |
| 2009/0311658 A1* | 12/2009 | Polivka | .................... | G09B 5/00 434/350 |

(Continued)

*Primary Examiner* — Xuan M Thai
*Assistant Examiner* — Sadaruz Zaman
(74) *Attorney, Agent, or Firm* — Venable LLP; Jeffri A. Kaminski

(57) ABSTRACT

Method, systems, and media for participating in and conducting a learning session of a collaborative network. Various embodiments of methods, systems, and media for participating in a learning session of a collaborative network are presented. User image data is received. The user image data is converted into expressive avatar information comprising an avatar identifier and an avatar emotion identifier. The expressive avatar information is transmitted. Altered instructional content is received, wherein the altered instructional content is an alteration of the instructional content and the alteration is based on a plurality of avatar identifiers and a plurality of avatar emotion identifiers, wherein the plurality of avatar identifiers comprises at least the avatar identifier, and wherein the plurality of avatar emotion identifiers comprises at least the avatar emotion identifier. User image data may be converted into expressive avatar data using facial expression recognition techniques.

20 Claims, 10 Drawing Sheets

(56) References Cited

U.S. PATENT DOCUMENTS

| | | | |
|---|---|---|---|
| 2010/0151431 A1* | 6/2010 | Miller | G09B 7/00 |
| | | | 434/350 |
| 2012/0089635 A1* | 4/2012 | Elchik | G06F 17/30669 |
| | | | 707/769 |
| 2012/0130717 A1 | 5/2012 | Xu et al. | |
| 2013/0004929 A1* | 1/2013 | Otwell | G09B 5/00 |
| | | | 434/350 |
| 2013/0095460 A1* | 4/2013 | Bishop | G09B 5/06 |
| | | | 434/308 |
| 2014/0006326 A1* | 1/2014 | Bazanov | G06Q 10/103 |
| | | | 706/46 |
| 2014/0045158 A1* | 2/2014 | Movsas | G09B 5/067 |
| | | | 434/236 |

* cited by examiner

| Emotion Values | Avatar Expression Identifiers |
|---|---|
| Emotion Value 1 | Avatar Expression Identifier 1 |
| Emotion Value 2 | Avatar Expression Identifier 2 |
| ... | ... |
| Emotion Value n | Avatar Expression Identifier m |

FACIAL EXPRESSION RECOGNITION IN EDUCATIONAL LEARNING SYSTEMS

CROSS-REFERENCE TO RELATED APPLICATIONS

This application claims priority to U.S. Provisional Patent Application Ser. No. 61/728,989, filed on Nov. 21, 2012, and U.S. Non-Provisional patent application Ser. No. 14/086,695, filed on Nov. 21, 2013, which are hereby incorporated by reference in their entirety.

BACKGROUND

The present invention relates to dissemination of education material in general, and to methods, systems, and media of developing such educational materials through an online collaboration environment.

With developments in the education industry, students seek access to course-related information and their own course work, anywhere, anytime. Student want current, relevant, interesting and engaging course materials and assignments taught by teachers, instructors, counselors and advisors who are aware of student's educational and professional path and goals based on a clear map of course progress and degree program. Enabling and facilitating students' online activities around their campus is a major consideration in providing the desired student experience.

Online education now demands providing educational services to a diverse global audience from different cultural backgrounds. Education providers face the challenge of providing high quality education across a diverse student population. Educational programs must provide skills that students can apply in their lives and professions to make a real difference in the real world. Educators must strive to create a community of learners connected to one another.

A learning management system (LMS), as referred to in the art, is software for delivering, tracking and managing training of students. LMSs range from systems for managing student training records to software for distributing courses over the Internet and offering features for online collaboration. In many instances, LMSs are used to automate record-keeping as well as to register students for classroom and online courses. Self-registration, faculty-led learning, learning workflow, the provision of on-line learning (e.g., read and understand), on-line assessment, management of continuous professional education (CPE), collaborative learning (e.g., application sharing, discussion threads), and learning resource management (e.g., instructors, facilities, equipment), are various aspects of LMSs.

FIG. 1 is a diagram depicting a known LMS 10, including one offered by Blackboard, WebCT, Moodle, eCollege and others, which allows a faculty member to place his or her courses, in whole or in part, online. As depicted, the faculty 12 plays a central role for mediating between a student 13, presenting course content 15 and assessing a student 14. LMSs 10 usually provide all-inclusive learning environments for faculty and students, with the faculty 12 disseminating instructional material specific to a course of study amongst students. As such, the faculty member serves as the facilitator, assessor and content developer.

Conceptually, there is no difference between the role of a teacher in conventional LMSs 10 and the role of a teacher in a bricks and mortar classroom. In both cases, the students are grouped and assigned a specific teacher. The teacher introduces all course content and materials into the classroom and mediates and assesses the learning process of the student. Thus, under LMS 10, the web is a tool to replicate, as closely as possible, the traditional classroom environment and the LMS 10 is limited by its system boundaries, just as the physical classroom is limited by four walls and doors.

With advances in content and media delivery technologies, the LMS model has not fully taken advantage of the available features for educating students. For example, such advances allow students to access educational content not only via laptops and desktops, but also smart phones, PDA's, iPods, Netbooks and eBooks. It is, for example, estimated that the majority of prospective student market has a smart phone or PDA, with advances content delivery capabilities via downloadable applications or by content streaming. These new devices have enabled users access to podcasting, wikis, blogs, web cams, eBook readers, MP3 players, social networks and virtual learning environments.

Conventional LMS developers' attempt in incorporating new features into their existing systems in some cases can result in significant developments cost in redesigning their content to incorporate the functionality of these new technologies. In other cases, the developers may have to open up their system platform through application programming interfaces (API's) to "bolt on" new technological capabilities. LMS redesign investment may be expensive, especially when new development work may not be able to keep up with the proliferation of ever advancing technologies and features. Opening up platforms through APIs may present a significant competitive disadvantage to LMS vendors and service providers who have invested heavily in their proprietary instructional material delivery systems.

Additionally, educational services are increasingly offered over global networks of institutions and universities. For example, Laureate Education Inc., the assignee of the present application, currently offers accredited campus-based and online courses in a wide variety of programs, including undergraduate and graduate degree programs and specializations, to nearly a wide range of students in numerous countries. Such a global educational network requires supporting learning environments that are tailored to bring to students a global perspective blended with a local point of view, creating a truly multicultural, career-oriented educational experience for students. For example, the educational experience may be a career-focused or licensing program, a multi-year undergraduate degree program, or master's and/or doctorate degree program in any one of a number of fields including engineering, education, business, health care, hospitality, architecture, and information technology, etc.

Laureate Education Inc.'s U.S. Patent Publication No. US 2009-0291426 A1, the entire contents of which are hereby incorporated by reference, discloses an "Educational System For Presenting One Or More Learning Units To Students In Different Learning Environments", where each unit is associated with an assessment information relating to students. A digital rights and asset management application controls access to the content associated with each one of said one or more units according to corresponding unit identifiers. An assessment application, e.g., a grade book application, stores assessment information derived from presenting the content to said one or more users in the first and second interactive environments, with the unit identifier correlating the assessment information with the units.

Laureate Education Inc.'s U.S. Patent Publication No. 2009-0311658 A1, the entire contents of which are hereby incorporated by reference, discloses "System And Method For Collaborative Development Of Online Courses And Programs Of Study" over a social network. A database stores an initial framework that defines a sequence of learning units for creating a desired learning environment for students. The learning units are identified by corresponding learning unit identifiers. A plurality of workstations coupled to the network are used for entry of reviewer information by the participants using the learning environment created for the students. The reviewer information comprise one or more comments entered by one participant about a learning unit and a rank entered by another participant about the comment, with the rank being correlated with a defined ranking standard. A processor processes the rank according to a predefined criteria to produce a ranking result that is associated with a learning unit identifier. The ranking result is used for associating learning content to the learning unit identified by the learning unit identifier.

The conventional learning process also involves receiving and responding to facial expressions from students. A facial expression is a visible manifestation of the affective state, cognitive activity, intention, personality, and psychopathology of a person. Facial expressions convey non-verbal cues and play an important role in the instructional setting. These cues may indicate that the student is perplexed, bored, excited, happy, thoughtful, frustrated, or a wide range of other emotions. Instructors in the conventional learning process use these cues as feedback and adapt lessons accordingly to meet their students' needs.

Also known are facial recognition software systems (FRSS). The paper "Facial Expression Recognition: A Brief Tutorial Overview" by Chibelushi and Bourel, the entire contents of which are hereby incorporated by reference, provides an overview of FRSS. Although humans recognize facial expressions virtually without any effort or delay, reliable expression recognition by machines is still a challenge. Several different approaches are known to overcome these challenges. These approaches include those described by U.S. Pat. No. 6,690,814 B1 to Yuasa et al., the entire contents of which are hereby incorporated by reference, and the article "Spontaneous Emotional Facial Expression Detection" by Zeng et al., Journal of Multimedia, Vol. 1, No. 5, August 2006, the entire contents of which are hereby incorporated by reference.

FIG. 2 illustrates a logic flow diagram depicting a known process for classifying facial expressions. The process in the FRSS 200 begins by acquiring an image 200. The image may be acquired from an input device, and the input device may be a camera, a video recorder, an integrated camera, a file, a streaming video source, a computer, a portable computer, a mobile device, a phone, or any other source capable of supplying an image. The image may be in the form of raw data 220. The image may be user image data 215. Pre-processing 230 may be performed on the raw data 220 to perform face segmentation. An example of face segmentation is shown in element 235. After pre-processing 235, feature extraction 240 may be performed, which converts pixel data in a higher-level representation, for example, shape, motion, color, texture, or spatial configuration of the face or its components. The extracted features are represented by feature vector 242, which includes basis vectors 244 and weights 246. Feature data may include feature vector 242, basis vectors 244, or weights 246. Classification 250 may be performed on the feature vector 242. Classification 250 uses a model 255 to determine which emotion 257 is present in the image. Post-processing 260 may be performed on the output from the classification 250. Post-processing uses techniques to improve recognition and includes techniques of exploiting domain knowledge to correct classification errors or coupling together several levels of classification hierarchy. The process in FRSS 200 produces an emotion value 270.

Also known are avatars. As used herein, an avatar is the graphical representation of the user or the user's alter ego or character. It may take either a three-dimensional form, as in games or virtual worlds, or a two-dimensional form as an icon in Internet forums and other online communities. It can also refer to a text construct. An avatar is an object representing the user. An avatar may be as simple as a smiley face or as complex as a virtual face. U.S. Pat. No. 7,751,599 B2 to Chen et al., the contents of which are hereby incorporated by reference, describes performing facial recognition to and converting the facial recognition into avatars.

With advances in information technologies, there exists a need for an educational system that can easily implement advances in learning technology for responding to users' facial expressions during the presentation of course content.

BRIEF SUMMARY

Various embodiments are generally directed to methods, systems, and media for participating in a learning session of a collaborative network. User image data is received. The user image data is converted into expressive avatar information comprising an avatar identifier and an avatar emotion identifier. The expressive avatar information is transmitted. Altered instructional content is received, wherein the altered instructional content is an alteration of the instructional content and the alteration is based on a plurality of avatar identifiers and a plurality of avatar emotion identifiers, wherein the plurality of avatar identifiers comprises at least the avatar identifier, and wherein the plurality of avatar emotion identifiers comprises at least the avatar emotion identifier.

Various embodiments are generally directed to methods, systems, and media for conducting a learning session over a collaborative network. Expressive avatar information associated with instructional content is received from a plurality of participant workstations, the expressive avatar information comprising a plurality of avatar identifiers and a plurality of avatar emotion identifiers. Instructional content is altered based on the plurality of avatar identifiers and the plurality of avatar emotion identifiers. The altered instructional content is transmitted to the plurality of participant workstations.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION OF THE DRAWINGS

The conventional systems discussed herein are unsatisfactory for a number of reasons. Transmitting video or image files over networks consumes a large amount of bandwidth because video and image files of people are typically quite large. For example, uncompressed video with the resolution of 720×486 pixels at 29.97 frames per second with 8 bit pixel encoding requires about 20 MB per second to transmit, or 70 GB per hour. An online course with 100 users would require around 7000 GB per hour. As a result, conventional LMS do not allow instructors to leverage the non-verbal cues present in facial expressions because the bandwidth required to transmit video or image files over networks does not scale to large numbers of users and becomes too prohibitive. This is evident with systems with smaller class sizes around 100 users.

Embodiments attempt to solve these problems by taking a different approach to transmitting facial expression information in a LMS. Image data of the users interacting with the LMS is received and converted into avatar information. Facial expression recognition is performed on the image data to determine the emotion or facial expression present on a user's face. The expression is represented by an avatar emotion identifier, and the user's avatar is identified by an avatar identifier. The expressive avatar information includes the avatar emotion identifier and the avatar identifier. The expressive avatar information may be represented using much less data than video, e.g., a byte or less for each data point, and may only need to be transmitted when the avatar or expression changes.

Figure 1:
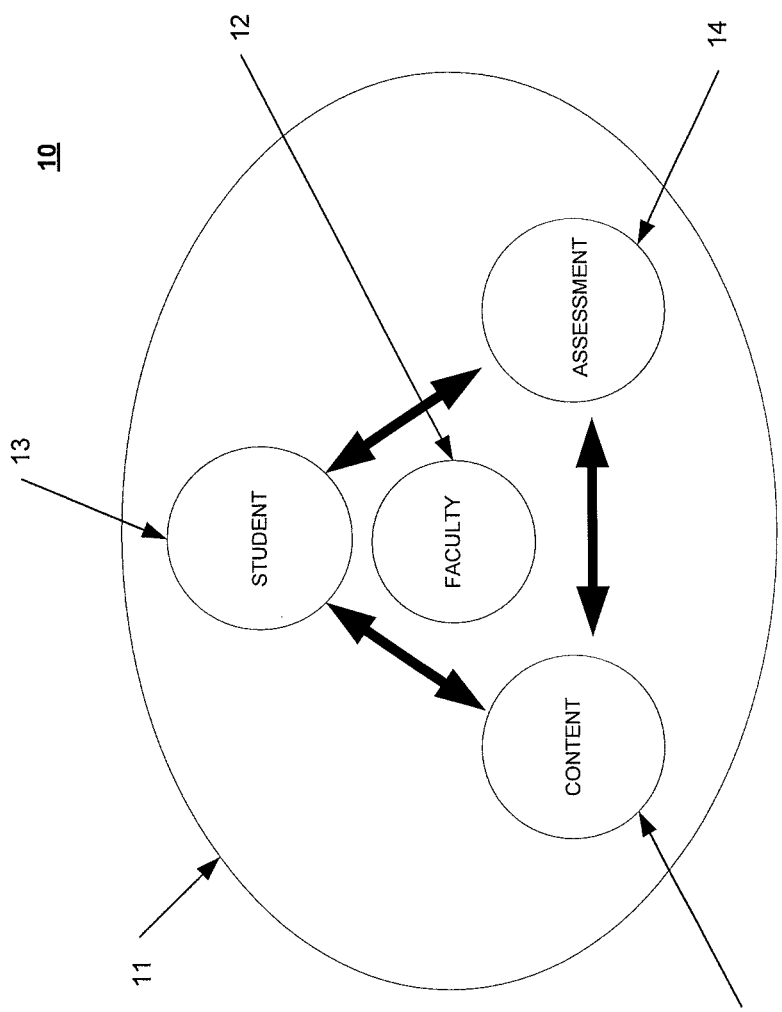
FIG. 1 illustrates a diagram depicting a known learning management system.
Figure 2:
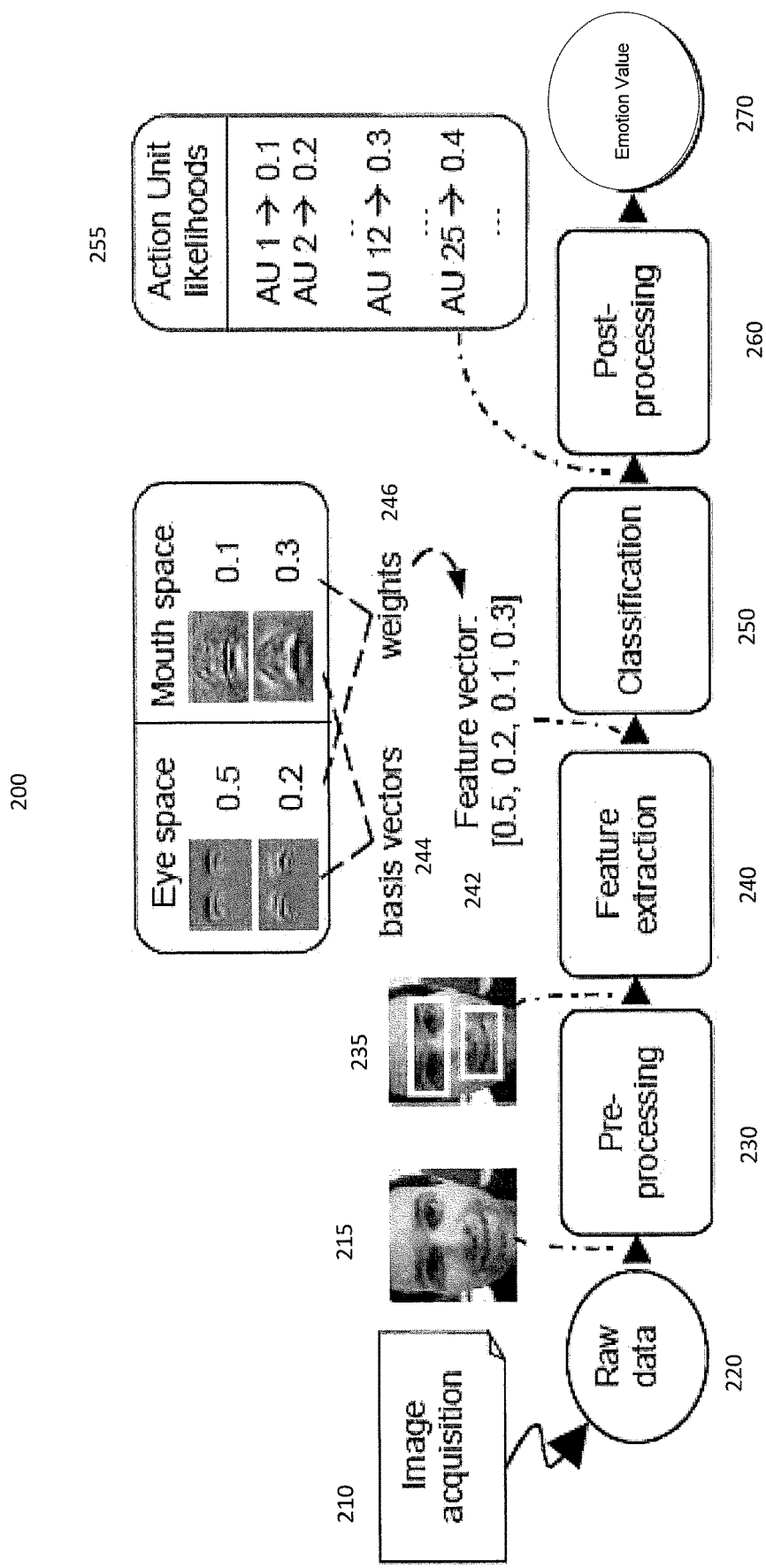
FIG. 2 illustrates a logic flow diagram depicting a known process for classifying facial expressions.
Figure 3:
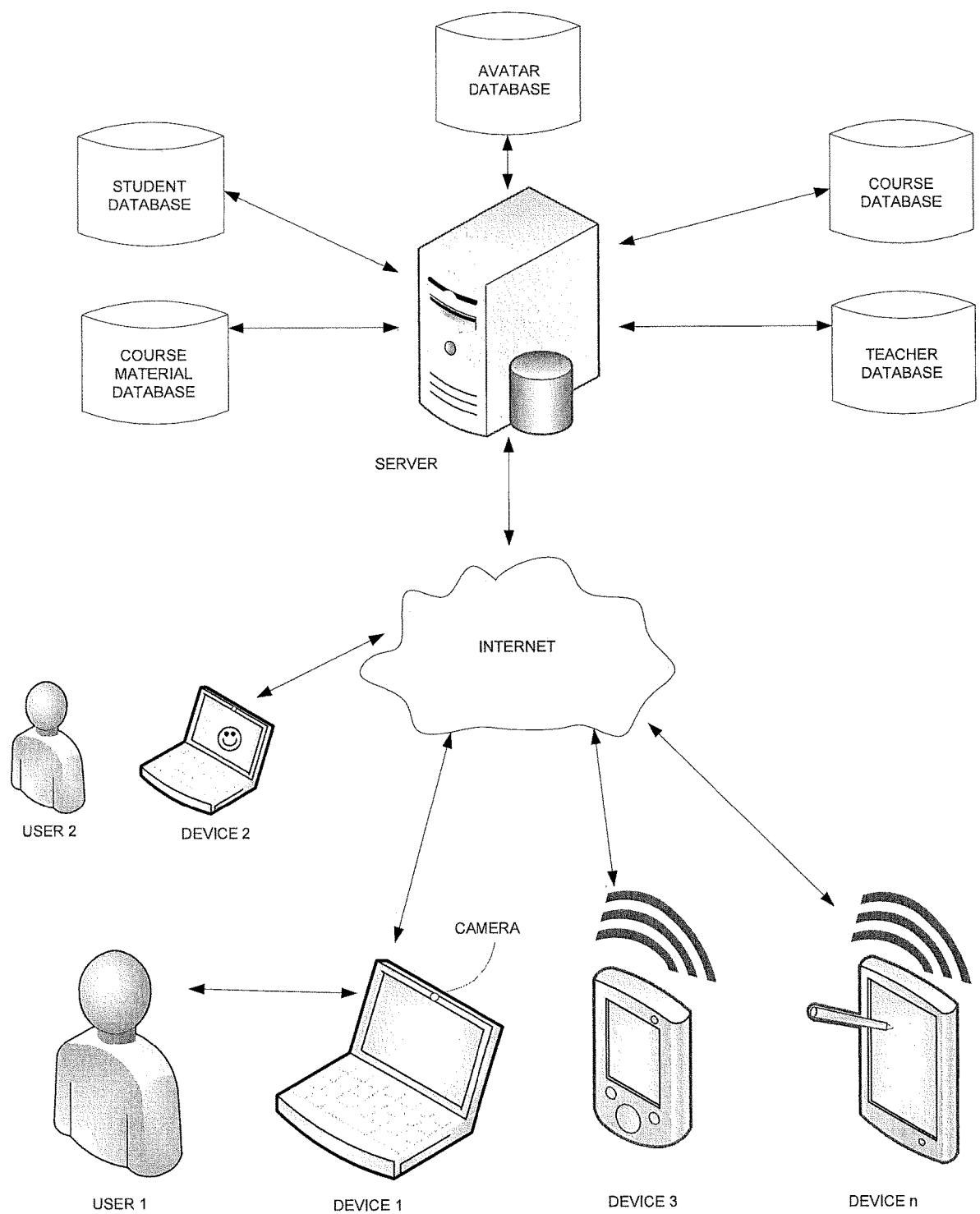
FIG. 3 illustrates a block diagram of an educational system that uses avatars in accordance with one or more embodiments.

FIG. 3 is a block diagram of one embodiment of an educational system that uses expressive avatar information for educational courses. According to the present invention, the courses instructional content that is may be altered based on the received expressive avatar information. In this embodiment, users 1-n are registered within a particular learning system or institution and may connect to a network (i.e. the Internet) through a mobile device, for example, a PDA, an iPad or a laptop computer. A server, maintained by the school/university or a third party vendor, may include an inventory of all users that are affiliated with the particular learning program or institution. In one embodiment, such users are associated with network address, e.g., IP addresses, that may be stored in a user's profile. When a user accesses the LMS through their device receives user image data from the user. The user image data may be received through an input device. The input device may be a camera, video recorder, an integrated camera, a file, a streaming video source, a computer, a portable computer, a mobile device, or a phone. The user device converts the user image data into expressive avatar information. The expressive avatar information is sent to the server. In one embodiment, the server may have access to one or more avatar databases that store expressive avatar information. The server may send the expressive avatar information for any or all of the users to device 2, and device 2 may display any or all of the avatar images corresponding to the expressive avatar information.

Figure 4:
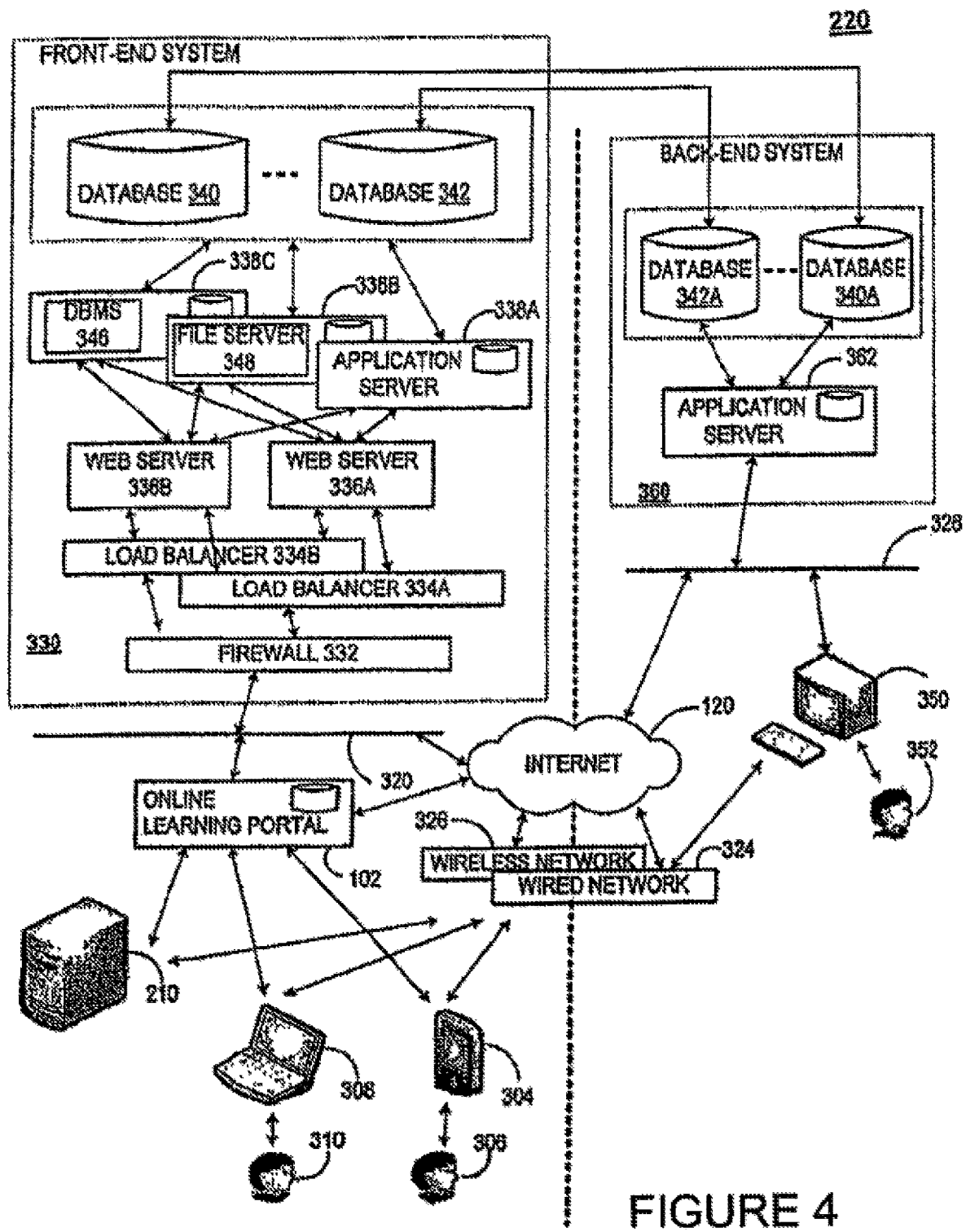
FIG. 4 illustrates a block diagram of a network having a front-end system and a back-end system in accordance with one or more embodiments.

FIG. 4 shows the block diagram of a network having a front-end system and a back-end system. The front-end system 330 includes a firewall 332, which is coupled to one or more load balancers 334a, 334b. Load balancers 334a-b are in turn coupled to one or more web servers 336a-b. To provide online learning sessions, the web servers 336a-b are coupled to one or more application servers 338a-c, each of which includes and/or accesses one or more front-end databases 340, 342, which may be central or distributed databases. The application servers serve various modules used for interaction between the different users and the learning system, including instructional enrolment module, course registration module, learning session management module, content delivery module, avatar module, proximity module and event module. The avatar module allows a student and/or teacher to interact with instructional content based expressive avatar information. The proximity module allows a teacher and/or students to interact with one another based on geographic proximity. The event module allows a teacher and/or student to interact with instructional material based on a geographical event. These modules may be run independently of each other based on corresponding teacher, student, geolocation and event profiles, as further described below.

Web servers 336a-b provide various user portals, including student, teacher, and event portals. The servers 336a-b are coupled to load balancers 334a-b, which perform load balancing functions for providing optimum online session performance by transferring client user requests to one or more of the application servers 338a-c according to a series of semantics and/or rules. The application servers 338a-c may include a database management system (DBMS) 346 and/or a file server 348, which manage access to one or more databases 340, 342. In the exemplary embodiment depicted in FIG. 4, the application servers 338a and/or 338b provide instructional content to the users 306, 310 which include electronic interfaces, progress reports, student profiles, teacher profiles, event profiles, as well as instructional content correlated with a student, teacher, course, school, expressive avatar information or event as processed by the server. Some of the instructional content is generated via code stored either on the application servers 338a and/or 338b, while some other information and content, such as student profiles, instructional material, teacher schedule, or other information, which is presented dynamically to the user, is retrieved along with the necessary data from the databases 340, 342 via application server 338c. The application server 338b may also provide users 306, 306 access to executable files which can be downloaded and installed on user devices 304, 310 for creating an appropriate learning environments and sessions, with branding and or marketing features that are tailored for a particular application, client or customer.

The central or distributed database 340, 342, stores, among other things, the web content and instructional material deliverable to the students. The avatar database 340, 342 also stores retrievable information relating to or associated with students, teachers, responsible authorities, parents, learning centers, profiles (student, facilitator, teacher, faculty, course developer, assessor, etc.), billing information, schedules, statistical data, attendance data, enrollment data, teacher attributes, student attributes, historical data, demographic data, compliance data, certification data, billing rules, third party contract rules, educational district requirements, expressive avatar information, etc. Any or all of the foregoing data can be processed and associated as necessary for achieving a desired learning objective or a business objective associated with operating the system of the present invention.

Updated program code and data are transferred from the back-end system 360 to the front-end system 330 to synchronize data between databases 340, 342 of the front-end system and databases 340*a*, 342*a* of the back-end system. Further, web servers 336*a*, 336*b*, which may be coupled to application servers 338*a*-*c*, may also be updated periodically via the same process. The back-end system 360 interfaces with a user device 350 such as a workstation, enabling interactive access for a system user 352, who may be, for example, a developer or a system administrator. The workstation 350 may be coupled to the back-end system 360 via a local network 328. Alternatively, the workstation 350 may be coupled to the back-end system 360 via the Internet 120 through the wired network 324 and/or the wireless network 326.

The back-end system 360 includes an application server 362, which may also include a file server or a database management system (DBMS). The application server 362 allows a user 352 to develop or modify application code or update other data, e.g., electronic content and electronic instructional material, in databases 340*a*, 342*a*. According to one embodiment, interactive client-side applications on the internet execute on a variety of internet delivery devices such as a web-browser, smart phones, and tablet devices such as the iPad, to provide an improved core student experience.

Figures 5A, 5B:
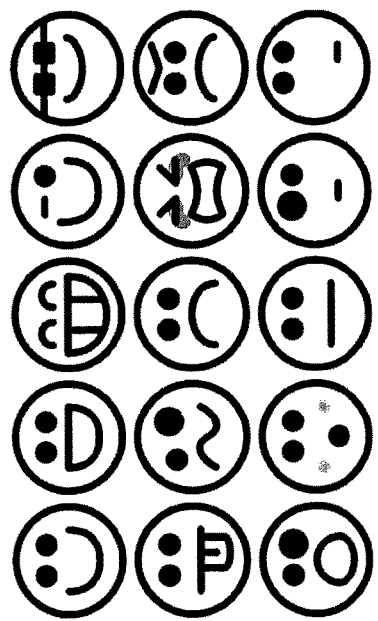
FIG. 5A illustrates a table of emotion values and avatar expression identifiers in accordance with one or more embodiments.
FIG. 5B illustrates a set of exemplary avatar images in accordance with one or more embodiments.

FIG. 5A illustrates a table of emotion values and avatar expression identifiers in accordance with one or more embodiments. Each emotion value corresponds the avatar expression identifier in the same row. Several emotion labels may correspond to the same avatar expression identifier.

FIG. 5B illustrates a set of exemplary avatar images in accordance with one or more embodiments. The avatar images may take either a three-dimensional form, as in games or virtual worlds, or a two-dimensional form as an icon in Internet forums and other online communities. It can also refer to a text construct. An avatar image is an object representing the user. The avatar image may be as simple as a smiley face as shown in FIG. 5 or as complex as a virtual face.

Figure 6:
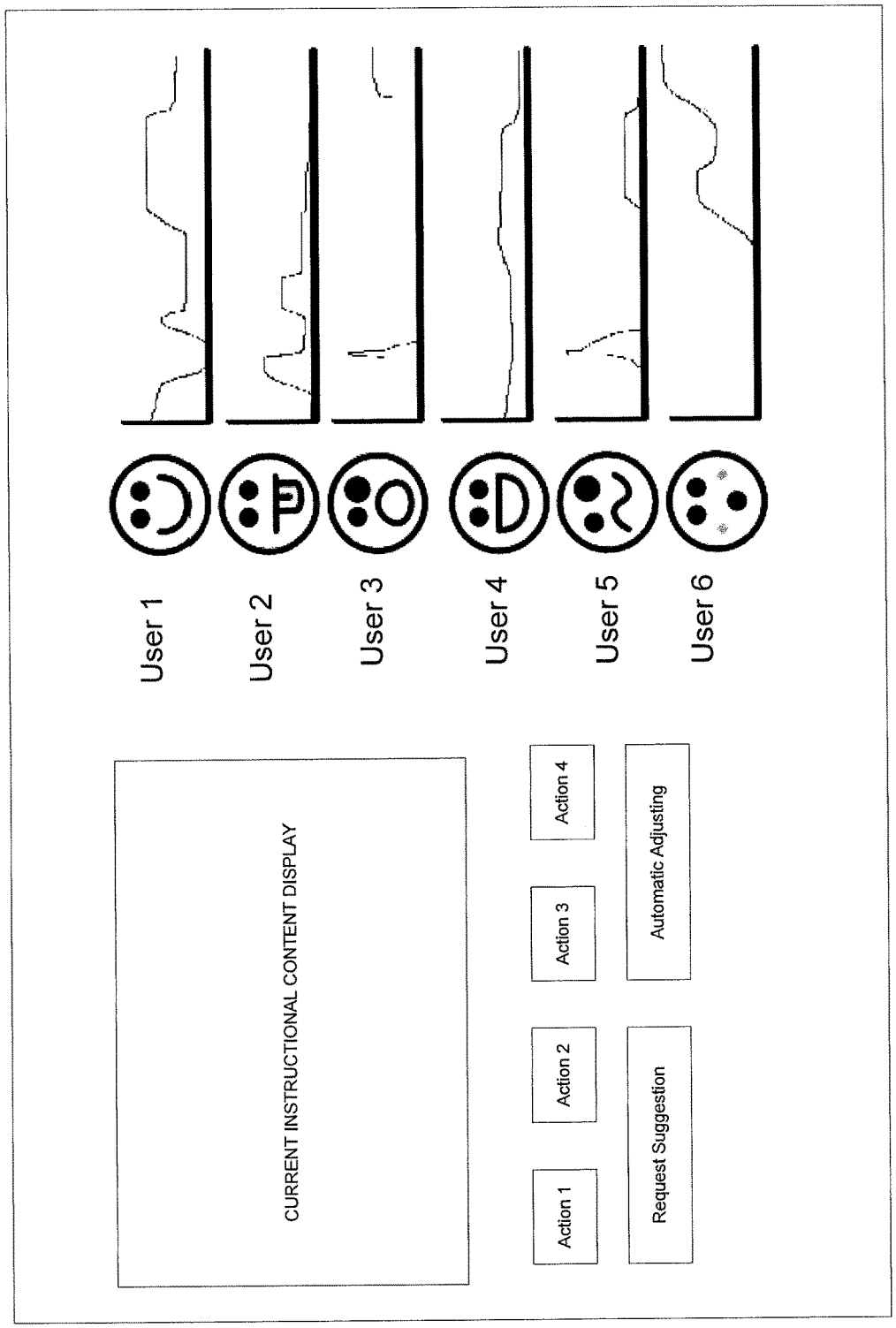
FIG. 6 illustrates an instructor interface in accordance with one or more embodiments.

FIG. 6 illustrates an instructor interface in accordance with one or more embodiments. In one embodiment, the instructor interface includes a current instructional content display, an avatar status display, and an action interface element associated with an action. The instructional content is displayed in the current instructional content display. When the content is altered, the altered content may be displayed in the current instructional content display in response to the alteration. The avatar status display lists the avatar images for a plurality of students that are viewing the content presented in the current instructional content display. Each avatar image may have the name of a user or an identifier of a user to let the instructor know which user avatar image corresponds to which user. The avatar status display may also include a graph that indicates changes of avatar images over the course of the presentation of course content. The action interface element may comprise a button or any other input element on the interface. The actions that correspond to the action interface element include pausing display of the content presented in the current instructional content display, stopping display of the content presented in the current instructional content display, replacing the content presented in the current instructional content display with other instructional content, inserting additional instructional content into the content presented in the current instructional content display, or any combination thereof. The interface may include any number of action interface elements that may correspond to any combination of actions. When the user performs an action, the system transmits the altered content to the other users of the system. The altered content may be selectively transmitted to all or some of the other users on the system.

In one embodiment the instructor interface 600 may also include a suggestion request interface element. When a user selects the suggestion request interface element, the system may provide the user with a suggested action. The suggestion may be any action or combination of actions that the system can take described above. The suggestion may be based on analysis of the expressive avatar information of the plurality of users. The system may compare the expressive avatar information to a model. The model may a simple model that merely counts the number of users have avatar emotion identifiers of each type. In this simple model, the threshold is the number avatar emotion identifier that is the highest of all avatar emotion identifiers. The threshold is exceeded by the avatar emotion identifier that has the most users. For example, if everyone has an avatar emotion identifier corresponding to happy, the system may alter the instructional content by performing an action associated with happy meeting the threshold. The model may base on more complicated machine learning or artificial intelligence techniques, including Bayesian learning techniques, artificial neural networks, kernel machines, genetic algorithms, rule-based learning techniques, or any other techniques currently known in the art. The suggested action is provided to the user of the instructional interface. The user take the suggestion and perform the suggest action to alter the content or the user may disregard the suggestion.

The instructor interface 600 may also include an automatic adjusting interface element. When a user selects the automatic adjusting interface element, the system determines a suggested action as described above with respect to the suggestion request interface element. However, instead of providing the suggestion to the user and waiting for a response to perform the action, the system performs the determined action without further user interaction. The system may continue to perform alterations to the instructional content during the presentation, or the system may only perform one action in response to selection of the automatic adjusting interface element. Alternatively, the system may continue to perform alterations until the expiration of a time period. The time period may be set by a user, configured by another user in the system, or determined by the machine.

Figure 7:
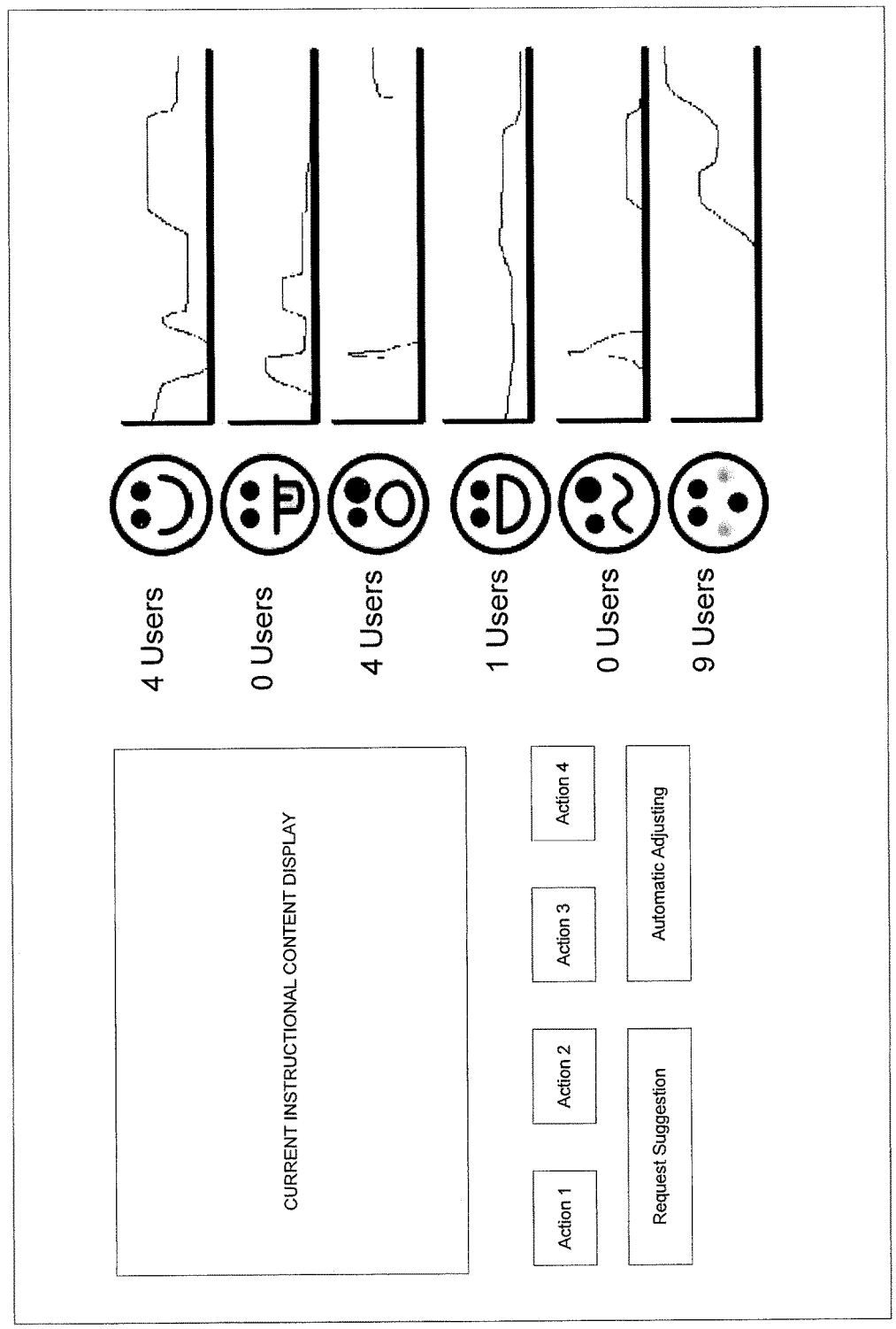
FIG. 7 illustrates an instructor interface in accordance with one or more embodiments.

FIG. 7 illustrates an instructor interface 700 in accordance with one or more embodiments. Instructor interface is similar instructor interface 600, except instructor interface 700 shows a configuration of the avatar status display. The avatar status display includes avatar images that represent the different types of avatar emotion identifiers. Next to each avatar image is the total number of users currently displaying a facial expression corresponding to the particular avatar emotion identifier. The graphs track the changes in the number of users for each avatar emotion identifier over the course of the presentation of course content. The instructor interface 600 and instructor interface 700 may include any combination of the displays and elements discussed herein.

Figure 8:
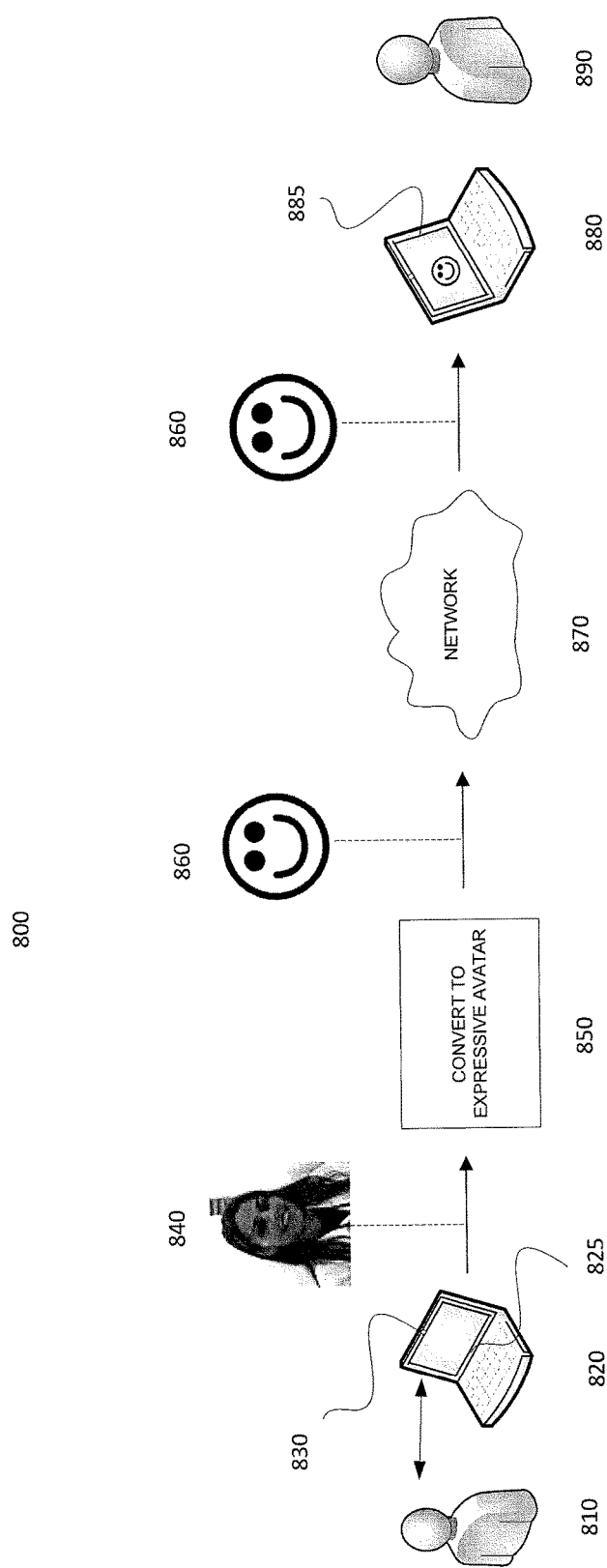
FIG. 8 illustrates a block diagram in accordance with one or more embodiments.

FIG. 8 illustrates a block diagram in accordance with one or more embodiments. The user operating a device interacts with the student interface. An input device of the device receives user image data. The user image data is converted into expressive avatar information. The expressive avatar information is transmitted through the network to another user's interface on the other user's device and represented on the other user's interface as an avatar image.

Figure 9:
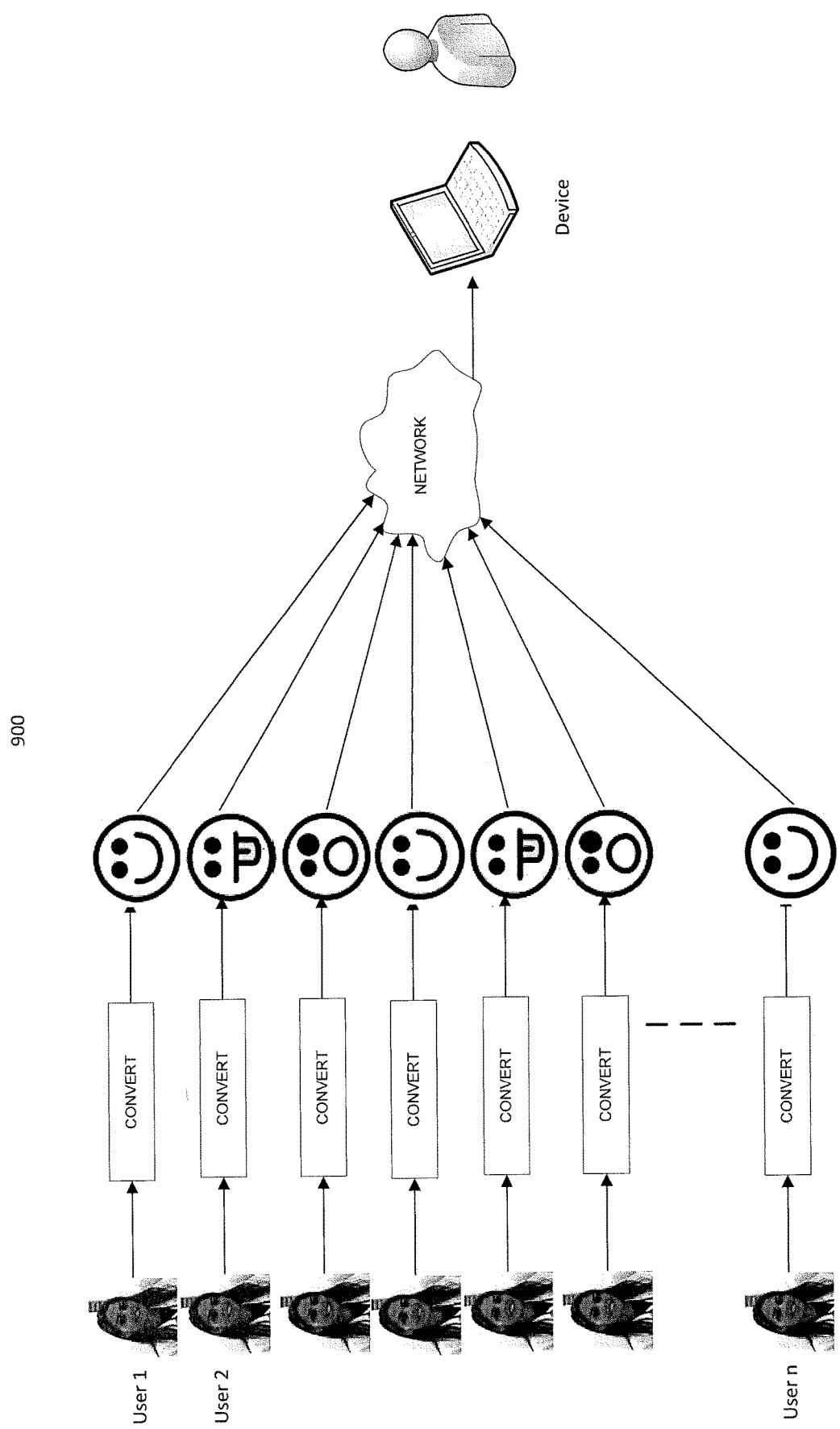
FIG. 9 illustrates a block diagram in accordance with one or more embodiments.

FIG. 9 illustrates a block diagram in accordance with one or more embodiments. A plurality of user image data is converted into expressive avatar information. A plurality of the expressive avatar information is transmitted through the network. The device receives the plurality of expressive avatar information.

Figure 10:
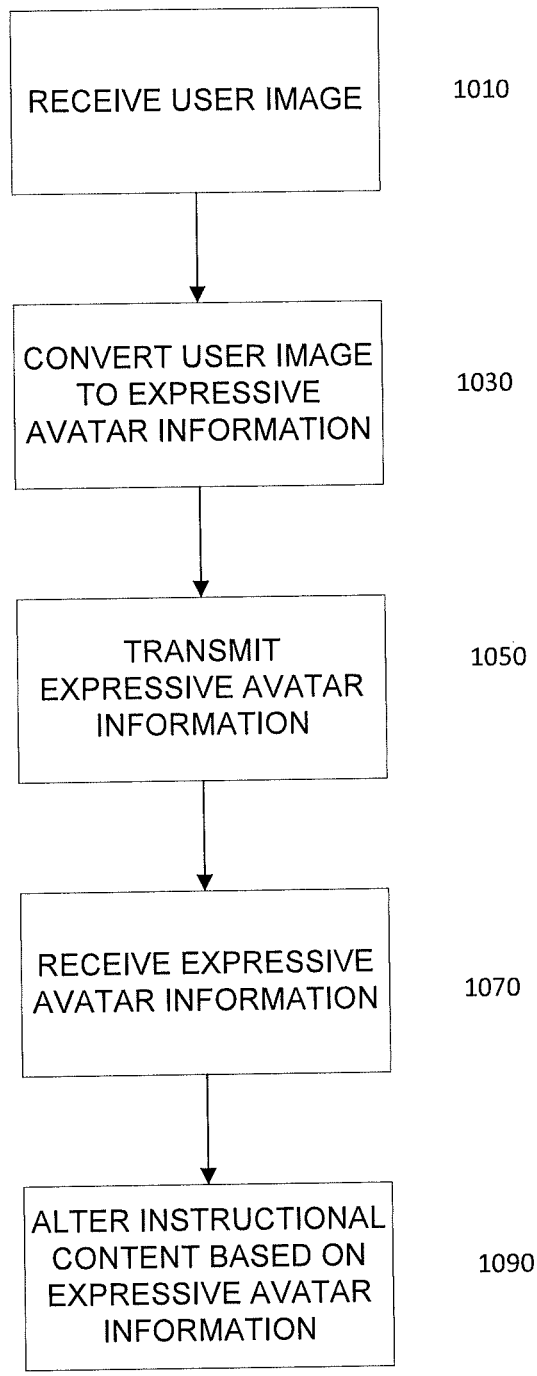
FIG. 10 illustrates a logic flow diagram in accordance with one or more embodiments.

FIG. 10 a logic flow diagram in accordance with one or more embodiments. At block 1010, a user image is received. At block 1030, the user image is converted to expressive avatar information. At block 1050, expressive avatar information is transmitted. At block 1070, expressive avatar information is received. At block 1090, instructional content is altered based on the expressive avatar information.

Numerous specific details have been set forth to provide a thorough understanding of the embodiments. It will be understood, however, that the embodiments may be practiced without these specific details. In other instances, well-known operations, components and circuits have not been described in detail so as not to obscure the embodiments. It can be appreciated that the specific structural and functional details are representative and do not necessarily limit the scope of the embodiments.

Various embodiments may comprise one or more elements. An element may comprise any structure arranged to perform certain operations. Each element may be implemented as hardware, software, or any combination thereof, as desired for a given set of design and/or performance constraints. Although an embodiment may be described with a limited number of elements in a certain topology by way of example, the embodiment may include more or less elements in alternate topologies as desired for a given implementation.

It is worthy to note that any reference to "one embodiment" or "an embodiment" means that a particular feature, structure, or characteristic described in connection with the embodiment is included in at least one embodiment. The appearances of the phrase "in one embodiment" in the specification are not necessarily all referring to the same embodiment.

Although some embodiments may be illustrated and described as comprising exemplary functional components or modules performing various operations, it can be appreciated that such components or modules may be implemented by one or more hardware components, software components, and/or combination thereof. The functional components and/or modules may be implemented, for example, by logic (e.g., instructions, data, and/or code) to be executed by a logic device (e.g., processor). Such logic may be stored internally or externally to a logic device on one or more types of computer-readable storage media.

Some embodiments may comprise an article of manufacture. An article of manufacture may comprise a storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of storage media include hard drives, disk drives, solid state drives, and any other tangible storage media.

It also is to be appreciated that the described embodiments illustrate exemplary implementations, and that the functional components and/or modules may be implemented in various other ways which are consistent with the described embodiments. Furthermore, the operations performed by such components or modules may be combined and/or separated for a given implementation and may be performed by a greater number or fewer number of components or modules.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within registers and/or memories into other data similarly represented as physical quantities within the memories, registers or other such information storage, transmission or display devices.

Some of the figures may include a flow diagram. Although such figures may include a particular logic flow, it can be appreciated that the logic flow merely provides an exemplary implementation of the general functionality. Further, the logic flow does not necessarily have to be executed in the order presented unless otherwise indicated. In addition, the logic flow may be implemented by a hardware element, a software element executed by a processor, or any combination thereof.

While certain features of the embodiments have been illustrated as described above, many modifications, substitutions, changes and equivalents will now occur to those skilled in the art. It is therefore to be understood that the appended claims are intended to cover all such modifications and changes as fall within the true spirit of the embodiments.

The invention claimed is:

1. A method comprising:
   transmitting, from a processor to a display, a plurality of avatars, wherein each avatar in the plurality of avatars corresponds to a respective user in a plurality of users;
   receiving, at the processor, images of a plurality of users from a plurality of cameras capturing the images of the plurality of users, wherein each image in the images corresponds to a respective user in the plurality of users;
   identifying, via the processor and based on the images, a change in emotion of a user in the plurality of users from a previous emotion to a new emotion;
   modifying, via the processor and based on the change in emotion, an avatar in the plurality of avatars being displayed, such that the avatar reflects the new emotion, the avatar corresponding to the user, resulting in a modified avatar; and
   transmitting the modified avatar to the display.

2. The method of claim 1, further comprising:
   transmitting, to the display and simultaneously with the plurality of avatars, instructional content.

3. The method of claim 2, further comprising:
   modifying the instructional content based on the change in emotion.

4. The method of claim 1, further comprising:
   assigning an emotion value to the change in emotion, wherein the new emotion is further based on the emotion value.

5. The method of claim 1, wherein the images are part of a video stream.

6. The method of claim 1, wherein each camera in the plurality of cameras is associated with a respective user in the plurality of users.

7. The method of claim 1, wherein the plurality of avatars are a graphical representation of the plurality of users.

8. A system comprising:
a processor;
a display; and
a non-transitory computer-readable storage medium having instructions stored which, when executed by the processor, cause the processor to perform operations comprising:
transmitting, to the display, a plurality of avatars, wherein each avatar in the plurality of avatars corresponds to a respective user in a plurality of users;
receiving images of a plurality of users from a plurality of cameras capturing the images of the plurality of users, wherein each image in the images corresponds to a respective user in the plurality of users;
identifying, based on the images, a change in emotion of a user in the plurality of users from a previous emotion to a new emotion;
modifying, based on the change in emotion, an avatar in the plurality of avatars being displayed, such that the avatar reflects the new emotion, the avatar corresponding to the user, resulting in a modified avatar; and
transmitting the modified avatar to the display.

9. The system of claim 8, the non-transitory computer-readable storage medium having additional instructions stored which, when executed by the processor, cause the processor to perform operations comprising:
transmitting, to the display and simultaneously with the plurality of avatars, instructional content.

10. The system of claim 9, the non-transitory computer-readable storage medium having additional instructions stored which, when executed by the processor, cause the processor to perform operations comprising:
modifying the instructional content based on the change in emotion.

11. The system of claim 8, the non-transitory computer-readable storage medium having additional instructions stored which, when executed by the processor, cause the processor to perform operations comprising:
assigning an emotion value to the change in emotion, wherein the new emotion is further based on the emotion value.

12. The system of claim 8, wherein the images are part of a video stream.

13. The system of claim 8, wherein each camera in the plurality of cameras is associated with a respective user in the plurality of users.

14. The system of claim 8, wherein the plurality of avatars are a graphical representation of the plurality of users.

15. A non-transitory computer-readable storage medium having instructions stored which, when executed by a computing device, cause the computing device to perform operations comprising:
transmitting, to a display, a plurality of avatars, wherein each avatar in the plurality of avatars corresponds to a respective user in a plurality of users;
receiving images of a plurality of users from a plurality of cameras capturing the images of the plurality of users, wherein each image in the images corresponds to a respective user in the plurality of users;
identifying, based on the images, a change in emotion of a user in the plurality of users from a previous emotion to a new emotion;
modifying, based on the change in emotion, an avatar in the plurality of avatars being displayed, such that the avatar reflects the new emotion, the avatar corresponding to the user, resulting in a modified avatar; and
transmitting the modified avatar to the display.

16. The non-transitory computer-readable storage medium of claim 15, having additional instructions stored which, when executed by the computing device, cause the computing device to perform operations comprising:
transmitting, to the display and simultaneously with the plurality of avatars, instructional content.

17. The non-transitory computer-readable storage medium of claim 16, having additional instructions stored which, when executed by the computing device, cause the computing device to perform operations comprising:
modifying the instructional content based on the change in emotion.

18. The non-transitory computer-readable storage medium of claim 16, having additional instructions stored which, when executed by the computing device, cause the computing device to perform operations comprising:
assigning an emotion value to the change in emotion, wherein the new emotion is further based on the emotion value.

19. The non-transitory computer-readable storage medium of claim 15, wherein the images are part of a video stream.

20. The non-transitory computer-readable storage medium of claim 15, wherein each camera in the plurality of cameras is associated with a respective user in the plurality of users.

* * * * *